(12) United States Patent
Costello et al.

(10) Patent No.: US 8,420,999 B2
(45) Date of Patent: Apr. 16, 2013

(54) METAL SHIELD AND HOUSING FOR OPTICAL PROXIMITY SENSOR WITH INCREASED RESISTANCE TO MECHANICAL DEFORMATION

(75) Inventors: James Costello, Singapore (SG); Wee Sin Tan, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 513 days.

(21) Appl. No.: 12/463,361

(22) Filed: May 8, 2009

(65) Prior Publication Data

US 2010/0282951 A1 Nov. 11, 2010

(51) Int. Cl.
*B65D 6/00* (2006.01)
*B65D 1/40* (2006.01)
*B65D 85/86* (2006.01)
*B65B 7/20* (2006.01)
*G06M 7/00* (2006.01)

(52) U.S. Cl.
USPC .................. 250/221; 220/6; 220/520; 53/491

(58) Field of Classification Search .................. 250/221, 250/239, 551, 338.1; 257/82; 220/6, 520; 53/491
See application file for complete search history.

(56) References Cited

U.S. PATENT DOCUMENTS

| 5,155,777 A | 10/1992 | Angelopoulos et al. |
| 5,367,393 A | 11/1994 | Ohara et al. |
| 5,675,143 A | 10/1997 | Heimlicher |
| 5,811,797 A | 9/1998 | Kobachi et al. |
| 6,064,062 A | 5/2000 | Bohn |
| 6,135,816 A | 10/2000 | Mashiyama et al. |

(Continued)

FOREIGN PATENT DOCUMENTS

| CN | 1743886 | 3/2006 |
| EP | 1 455 564 A1 | 9/2004 |

(Continued)

OTHER PUBLICATIONS

"Agilent HSDL-D100 Miniature Surface-Mount Proximity Sensor Data Sheet", In current form on Dec. 21, 2007.

(Continued)

*Primary Examiner* — Thanh Luu
*Assistant Examiner* — Renee Naphas

(57) ABSTRACT

An optical proximity sensor is provided that comprises an infrared light emitter operably connected to and driven by a light emitter driving circuit and a light detector operably connected to and driven by a detector sensing circuit. A metal housing or shield formed of metal and comprising first and second apertures surrounds the light emitter and the light detector such that at least a first portion of light emitted by the light detector passes through the first aperture, and at least a second portion of the first portion of light reflected from an object of interest in proximity to the sensor passes through the second aperture for detection by the light detector. The metal housing or shield further comprises first and second modules within which the light detector and light detector are disposed, respectively. The first and second modules comprise adjoining optically opaque metal inner sidewalls that provide optical isolation between the first and second modules, where the first and second inner sidewalls are separated from one another by at least one metal tab foldably disposed therebetween. The at least one metal tab is configured to transfer a vertical force applied to one end of one module to an opposite end of the other module.

20 Claims, 8 Drawing Sheets

U.S. PATENT DOCUMENTS

| | | |
|---|---|---|
| 6,180,881 B1 | 1/2001 | Isaak |
| 6,364,706 B1 | 4/2002 | Ando et al. |
| 6,572,410 B1 | 6/2003 | Volstorf et al. |
| 6,635,955 B2 | 10/2003 | Scheidle |
| 6,674,653 B1 | 1/2004 | Valentine |
| 6,885,300 B1 | 4/2005 | Johnston et al. |
| 7,026,710 B2 | 4/2006 | Coyle et al. |
| 7,172,126 B2 | 2/2007 | Schmidt et al. |
| 7,229,295 B2 | 6/2007 | Ice et al. |
| 7,256,483 B2 | 8/2007 | Eppler et al. |
| 7,258,264 B2 | 8/2007 | Ice et al. |
| 7,277,012 B2 | 10/2007 | Johnston et al. |
| 7,289,142 B2 | 10/2007 | Silverbrook |
| 7,387,033 B2 | 6/2008 | Qing et al. |
| 7,387,907 B2 | 6/2008 | Hsu et al. |
| 7,427,806 B2 | 9/2008 | Arndt et al. |
| 7,510,888 B2 | 3/2009 | Guenther et al. |
| 7,582,513 B2 | 9/2009 | Kroeninger et al. |
| 7,675,132 B2 | 3/2010 | Waitl et al. |
| 7,767,485 B2 | 8/2010 | Ogawa et al. |
| 7,851,246 B2 | 12/2010 | Camacho et al. |
| 2002/0172472 A1 | 11/2002 | Nelson et al. |
| 2004/0065894 A1 | 4/2004 | Hashimoto et al. |
| 2005/0088900 A1 | 4/2005 | Chan |
| 2005/0110157 A1 | 5/2005 | Sherrer et al. |
| 2006/0016994 A1* | 1/2006 | Basoor et al. ............. 250/338.1 |
| 2006/0017069 A1 | 1/2006 | Bergmann |
| 2006/0022212 A1 | 2/2006 | Waitl et al. |
| 2006/0022215 A1 | 2/2006 | Arndt et al. |
| 2006/0118807 A1 | 6/2006 | Ives et al. |
| 2007/0045524 A1 | 3/2007 | Rains |
| 2007/0072321 A1 | 3/2007 | Sherrer et al. |
| 2007/0085157 A1 | 4/2007 | Fadell |
| 2008/0006762 A1 | 1/2008 | Fadell et al. |
| 2008/0011939 A1 | 1/2008 | Yee |
| 2008/0011940 A1 | 1/2008 | Zhang et al. |
| 2008/0012033 A1 | 1/2008 | Arndt |
| 2008/0049210 A1 | 2/2008 | Takaoka |
| 2008/0116379 A1 | 5/2008 | Teder |
| 2008/0118241 A1 | 5/2008 | TeKolste et al. |
| 2008/0165115 A1 | 7/2008 | Herz et al. |
| 2008/0173963 A1 | 7/2008 | Hsu et al. |
| 2008/0197376 A1 | 8/2008 | Bert et al. |
| 2008/0223934 A1 | 9/2008 | Havens et al. |
| 2008/0265266 A1 | 10/2008 | Bogner et al. |
| 2008/0296478 A1 | 12/2008 | Hernoult |
| 2008/0308738 A1 | 12/2008 | Li et al. |
| 2008/0308917 A1 | 12/2008 | Pressel et al. |
| 2009/0101804 A1 | 4/2009 | Le |
| 2009/0129783 A1 | 5/2009 | Ori et al. |
| 2009/0159900 A1* | 6/2009 | Basoor et al. .................. 257/82 |
| 2009/0168088 A1 | 7/2009 | Rosenblatt |
| 2009/0267173 A1 | 10/2009 | Takahashi et al. |
| 2010/0030039 A1 | 2/2010 | Lamego et al. |
| 2010/0246771 A1 | 9/2010 | Hawver et al. |
| 2010/0282951 A1 | 11/2010 | Costello et al. |
| 2010/0327164 A1 | 12/2010 | Costello et al. |
| 2011/0024627 A1 | 2/2011 | Yao |
| 2001/0057104 | 3/2011 | Yao et at. |
| 2011/0057102 A1 | 3/2011 | Yao |
| 2011/0057128 A1 | 3/2011 | Guenter et al. |
| 2011/0057129 A1 | 3/2011 | Yao |
| 2011/0204233 A1 | 8/2011 | Costello et al. |

FOREIGN PATENT DOCUMENTS

| | | |
|---|---|---|
| GB | 2486000 | 6/2012 |
| JP | 63308973 | 12/1988 |
| WO | WO 2009/072786 | 6/2009 |
| WO | WO 2009072786 | 6/2009 |

OTHER PUBLICATIONS

Avago Technologies, "APDS-9005 Miniature Surface-Mount Ambient Light Photo Sensor", Jan. 2007.

Avago Technologies, "APDS-9700 Signal Conditioning IC for Optical Proximity Sensors", Jan. 4, 2008.

Avago Technologies, "HSDL-9100—Surface-Mount Proximity Sensor", Data Sheet 2006.

Avago Technologies, "Integrated Ambient Light and Proximity Sensor Prelim Datasheet", APDS-9800 Mar. 2, 2009.

Avago Technologies, "Integrated Optical Proximity Sensors Prelim Datasheet", APDS-9120 Feb. 25, 2009.

AZ Optics, "Device Debuts as the World's Best-Performing Integrated Light/Proximity Sensor", Nov. 11, 2008.

Costello, et al., "U.S. Appl. No. 12/495,739", Optical Proximity Sensor Package with Molded Infrared Light Rejection Barrier and Infrared Pass Components Jun. 30, 2009.

IDES—The Plastic Web, "Si Photo Diode Chip", Dec. 19, 2007.

Ishihara, et al., "A Dual Face Package Using a Post with Wire Components: Novel Structure for PoP Wafer Level CSP and Compact Image Sensor Package", Electronic Components and Technology Conference 2008, 1093-1098.

Khamal, Ibrahim, "Infra-Red Proximity Sensor (II)", Apr. 4, 2008.

Losee, et al., "A ⅓ Format Image Sensor with Refractory Metal Light Shield for Color Video Applications", Solid State Circuits Conference, Digest of Technical Papers, 36th ISSCC, IEEE International Volume. Feb. 1989, 90-91.

Nitto Denko Corporation, "Technical Data Sheet", NT-8506 2001.

Nitto Denko Corporation, "Technical Data Sheet", NT-MB-IRL3801 2008.

Penchem Technologies Data Sheet, "Pemchem OP 580", IR Filter Optoelectronic Epoxy Apr. 2009.

Penchem Technologies Data Sheet, "Penchem OP 579", IR Pass Optoelectronic Epoxy Apr. 2009.

Tan, et al., "U.S. Appl. No. 12/623,767", Infrared Proximity Sensor Pack with Improved Crosstalk Isolation, filed Nov. 23, 2009, 30 pages.

TYNTEK, "Data Sheet for AlGaAs/GaAs Infrared Chip", TK116IRA Nov. 2006.

TYNTEK, "Data Sheet for AlGaAs/GaAs Infrared Chip", TK114IRA Mar. 2004.

TYNTEK, "Data Sheet for Si Photo-diode Chip", TK 043PD Jun. 2004.

TYNTEK, "Si Photo-Diode Chip—TK043PD Data Sheet", Dec. 19, 2007.

XYDAR, "G-930—Solvay Advanced Polymers—Liquid Crystal Polymer Data Sheet", reproduced from website at www.ides.com/grades/ds/E22219.htm on Dec. 17, 2007.

APDS-9101 Integrated Reflective Sensor, Data Sheet, 2007, Avago Technologies.

HSDL-9100 Surface-Mount Proximity Sensor/Data Sheet, 2006, Avago Technologies.

"Agilent HSDL-9100 Miniature Surface-Mount Proximity Sensor Data Sheet", Dec. 21, 2007.

"APDS-9900 and APDS-9901 Digital Proximity and Ambient Light Sensor", Mar. 23, 2011.

Avago Technologies, "Avago Technologies Announces Ultra-Thin integrated Ambient Light and Proximity Sensor Module for Use in Mobile Phones", *Wireless Design and Development* Nov. 27, 2009.

\* cited by examiner

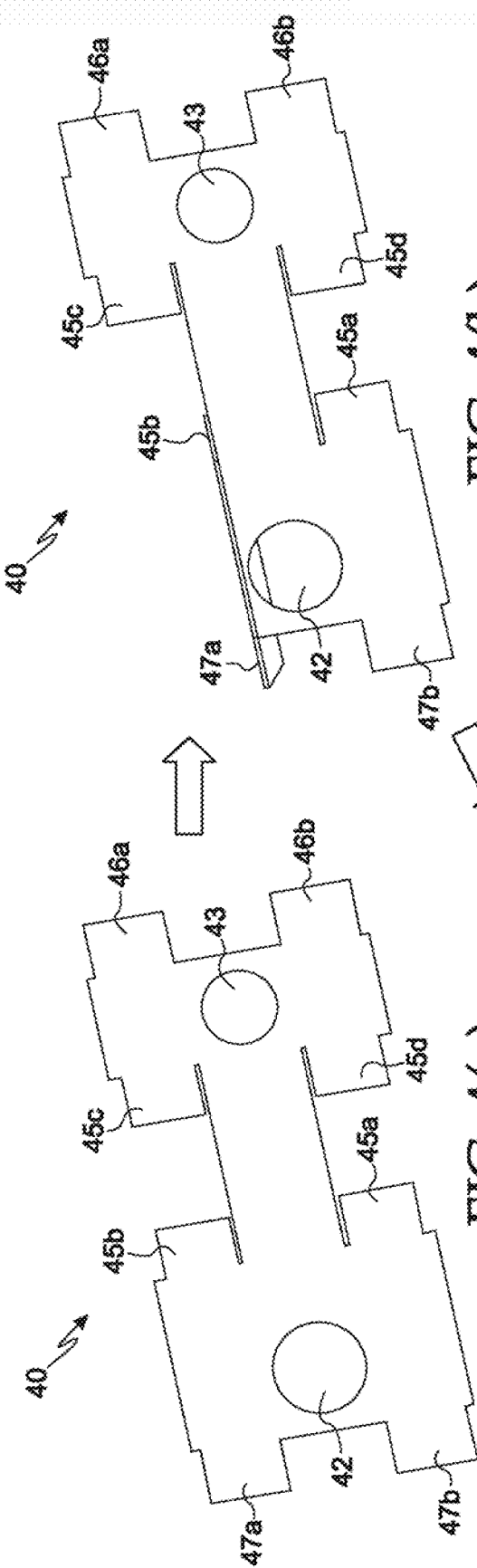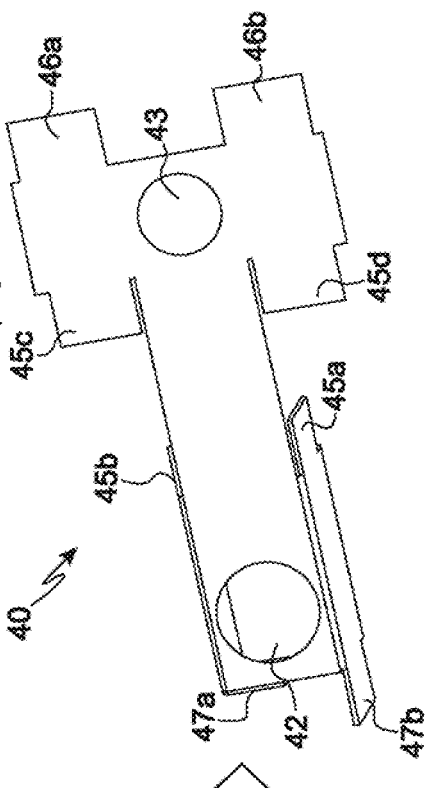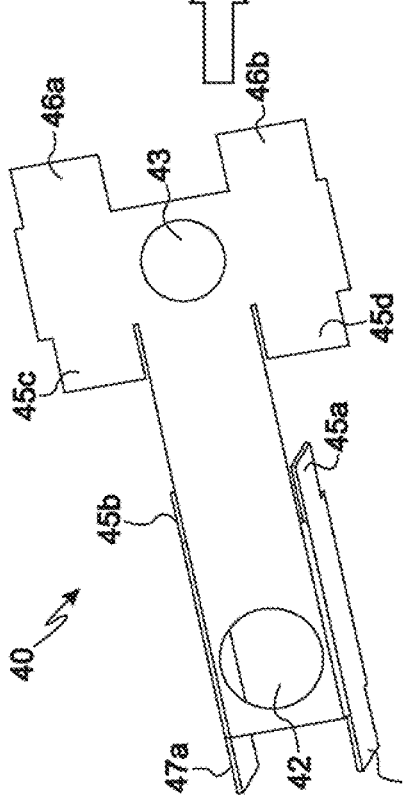

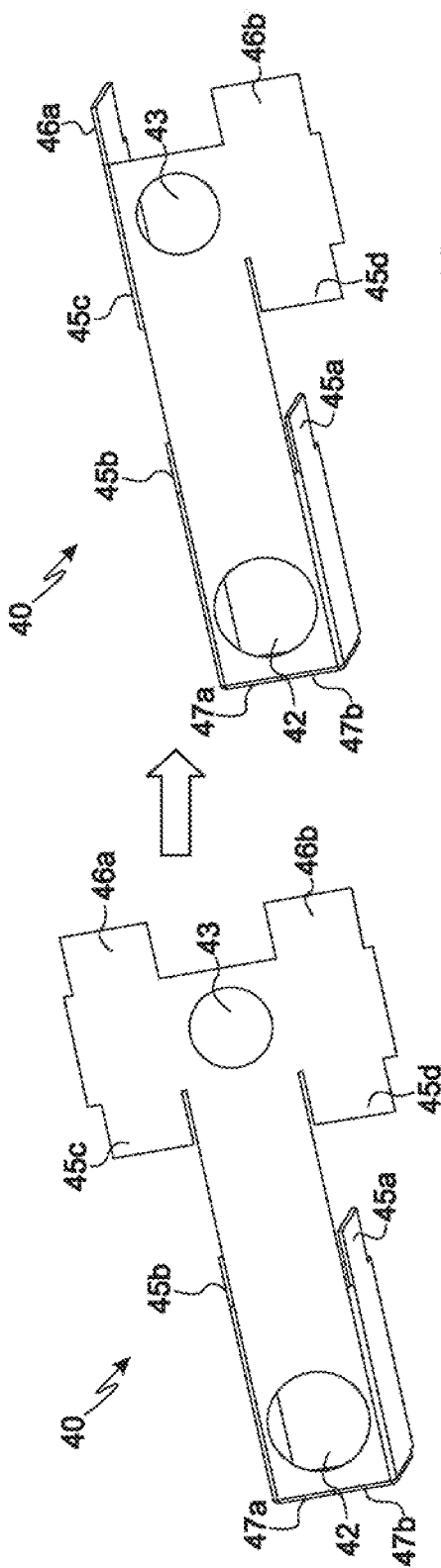
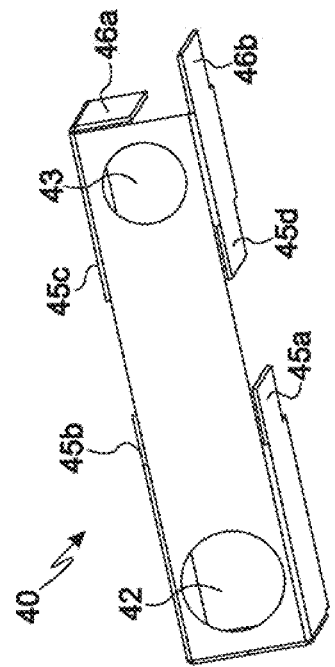
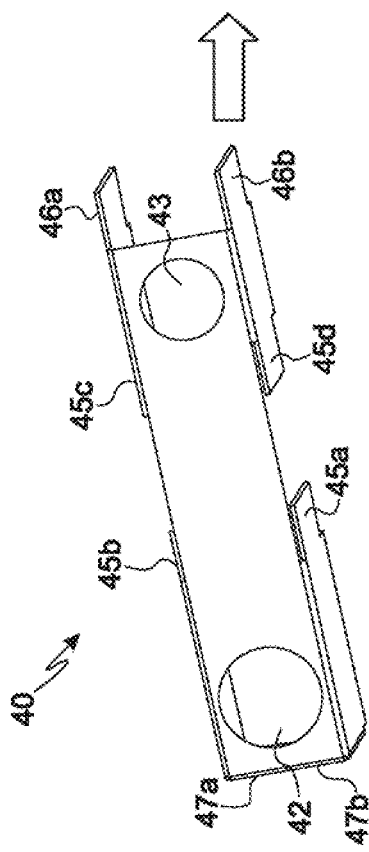

METAL SHIELD AND HOUSING FOR OPTICAL PROXIMITY SENSOR WITH INCREASED RESISTANCE TO MECHANICAL DEFORMATION

FIELD OF THE INVENTION

Various embodiments of the inventions described herein resale to the field of proximity sensors, and components, devices, systems and methods associated therewith.

BACKGROUND

Optical proximity sensors, such as the AVAGO TECHLOGIES™ HSDL-9100 surface-mount proximity sensor and the AVAGO TECHLOGIES™ APDS-9101 integrated reflective sensor, are known in the art. Such sensors typically comprise an integrated high efficiency infrared emitter or light source and a corresponding photodiode or light detector. Referring to FIG. 1, there is shown a prior art optical proximity sensor 10 comprising infrared light emitter 20, light emitter driving circuit 21, light detector or photodiode 30, light detector sensing circuit 31, metal housing or shield 40 with apertures 41 and 42, and object, to be sensed 50. Light rays 22 emitted by emitter 20 and reflected from object 50 (which is in relatively close proximity to optical proximity sensor 10) are detected by photodiode 31 and thereby provide an indication that object 60 is close or near to sensor 10.

As further shown in FIG. 1, optical proximity sensor 10 further comprises metal housing or shield 40 formed of metal and comprising apertures 42 and 43 located over light emitter 20 and light detector 30, respectively, such that at least a first portion of light 22 emitted by light detector 20 passes through aperture 43, and at least a second portion of the first portion 22 of light reflected from object 50 in proximity to sensor 10 passes through aperture 42 for detection by light detector 20. As shown, metal housing or shield 40 further comprises first and second modules 41 and 44 within which light emitter 20 and light detector 30 are disposed, respectively. The first and second modules 41 and 44 comprise adjoining optically opaque metal inner sidewalls 45 to provide optical isolation between first and second modules 41 and 44.

Sensors such as the HSDL-9100 generally include a metal shield, such as shield or housing 40 shown in FIG. 1, to provide optical isolation between light emitter 20 and photodiode 30 so that undesired optical cross-talk between emitter 20 and detector 30 is minimized. See, for example, the Data Sheets corresponding to the AVAGO TECHLOGIES™ HSDL-9100 Surface-Mount Proximity Sensor and the AVAGO TECHLOGIES™ APDS-9101 integrated Reflective Sensor, each of which is hereby incorporated by reference herein, each in its respective entirety.

FIG. 2 shows a prior art optical proximity sensor 10 with metal shield or housing 40 that, has been damaged during the process of preparing sensor 10 for mounting on a printed circuit board. (Sensor 10 shown in FIG. 2 is a surface mount device or SMD, and comprises printed circuit board or PCB substrate 61, which is configured to permit sensor 10 to be attached to an underlying PCB, not shown in FIG. 2.) As shown in FIG. 2, top covers 43 and 44 of housing 40 have been bent upwardly during handling of sensor 10 by automated assembly machinery, resulting in optical proximity sensor 10 becoming unusable for its intended function or purpose as an SMD optical proximity sensor mounted on a printed circuit board. It is believed that sponge-like material on the assembly machinery engages and protrudes through one or both of apertures 41 and 42 but does not subsequently release adequately therefrom, resulting in the damage to top covers 43 and 44 shown in FIG. 1

What is needed is a metal housing or shield for an optical proximity sensor that is easily manufacturable at low cost but that is also sufficiently structurally robust to resist undesired mechanical deformation during the manufacturing and assembly process.

SUMMARY

In some embodiments, there is provided an optical proximity sensor comprising an infrared light emitter operably connected to and driven by a light emitter driving circuit, a light detector operably connected to and driven by a detector sensing circuit, a metal housing or shield formed of metal and comprising first and second apertures located over the light emitter and the light detector, respectively, such that at least a first portion of light emitted by the light detector passes through the first aperture, and at least a second portion of the first portion of light reflected from ah object of interest in proximity to the sensor passes through the second aperture for detection by the light detector, wherein the metal housing or shield further comprises first and second modules within which the light detector and light detector are disposed, respectively, the first and second modules comprising adjoining optically opaque metal inner sidewalls to provide optical isolation between the first and second modules, the first and second inner sidewalls further being separated from one another by at least one metal tab foldably disposed therebetween, the at least one metal tab being configured to transfer a vertical force applied to one end of one module to an opposite end of the other module.

In other embodiments, there is provided a method of forming a metal housing or shield for an optical proximity sensor comprising forming a fiat sheet of metal configured to be folded into the shield or housing, the flat-sheet of metal comprising a plurality of tabs extending outwardly therefrom, folding the flat sheet of metal into first and second modules configured to house a light emitter and a light detector therewithin, respectively, such that the first and second modules comprise adjoining optically opaque metal inner sidewalls to provide optical isolation therebetween, the first and second inner sidewalls further being separated from one another by the plurality of tabs foldably disposed therebetween, the tabs and first and second modules further being configured to translate a vertical force applied to one end of one of the modules to an opposite end of the other module.

Further embodiments are disclosed heroin or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In the various embodiments described and disclosed herein, a metal shield or housing is provided for an optical proximity sensor or related type of sensor where the shield or housing is easily manufacturable at low cost but also possesses sufficient structurally robustness to resist undesired mechanical deformation during the manufacturing and assembly process.

Figure 1:
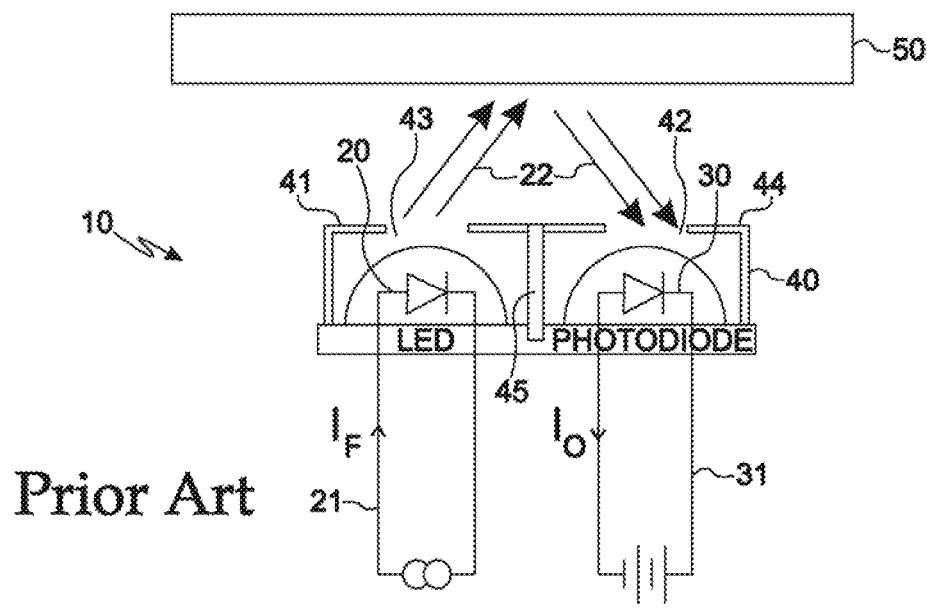
FIG. 1 shows a cross-sectional view of a prior art optical proximity sensor.
Figure 2:
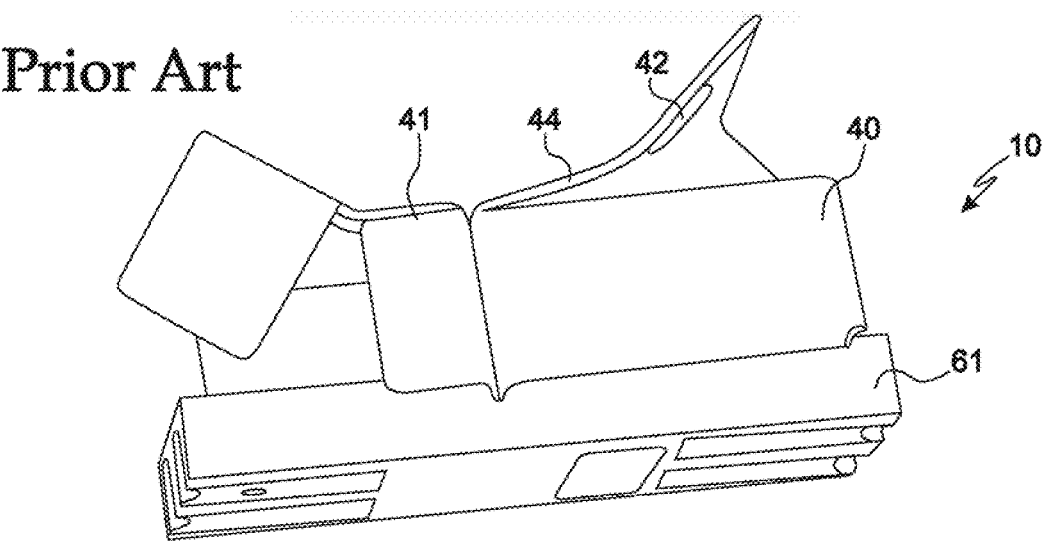
FIG. 2 shows a bottom perspective view of a prior art optical proximity sensor where the metal shield or housing has sustained undesired damage.

As described above, FIG. 1 shows a cross-sectional view of a prior art optical proximity sensor 10, and FIG. 2 shows a bottom perspective view of a prior art optical proximity sensor where a top portion of metal shield or housing 40 of sensor 10 has sustained undesired damage.

Referring now to FIGS. 3(a) through 3(d) there are shown top, side, end and perspective views, respectively, of an optical proximity sensor metal shield or housing 40 according to one embodiment. As shown, housing or shield 40 shares certain similarities with prior art housing or shield illustrated in FIGS. 1 and 2. For example, housing or shield 40 of FIGS. 3(a) through 3(d), like housing or shield 40 of FIGS. 1 and 2, includes apertures 42 and 42, first and second modules 41 and 44 configured to receive light emitter 20 and light detector 30, respectively, therein, and optically opaque sidewalls disposed between first and second modules 41 and 44.

Figure 3A:
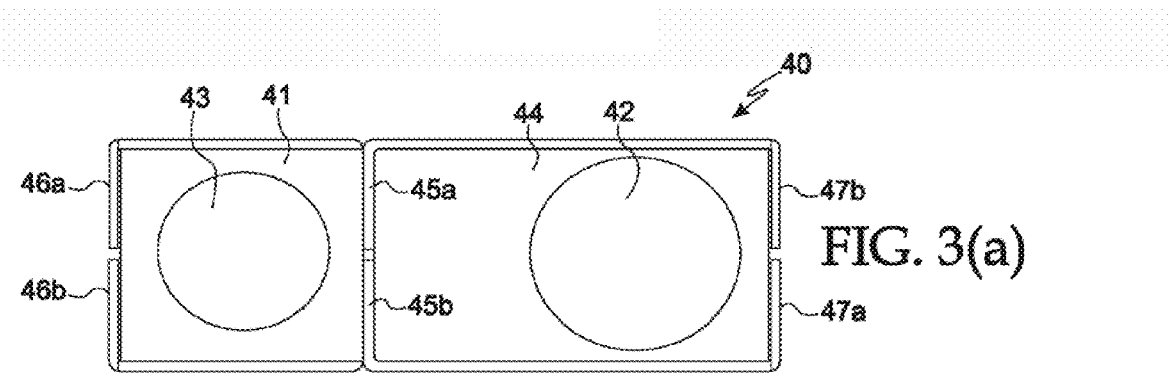
FIGS. 3(a) through 3(d) show top, side, end and perspective views, respectively, of an optical proximity sensor metal shield or housing according to one embodiment.
Figure 3B:
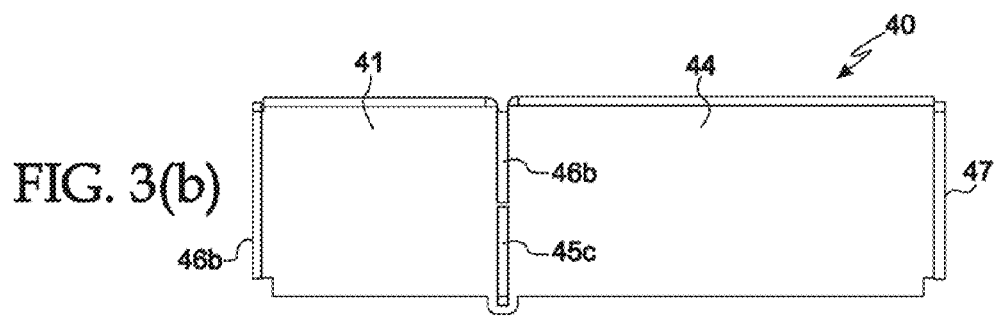
Figure 3C:
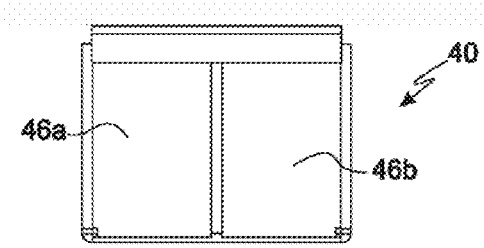
Figure 3D:
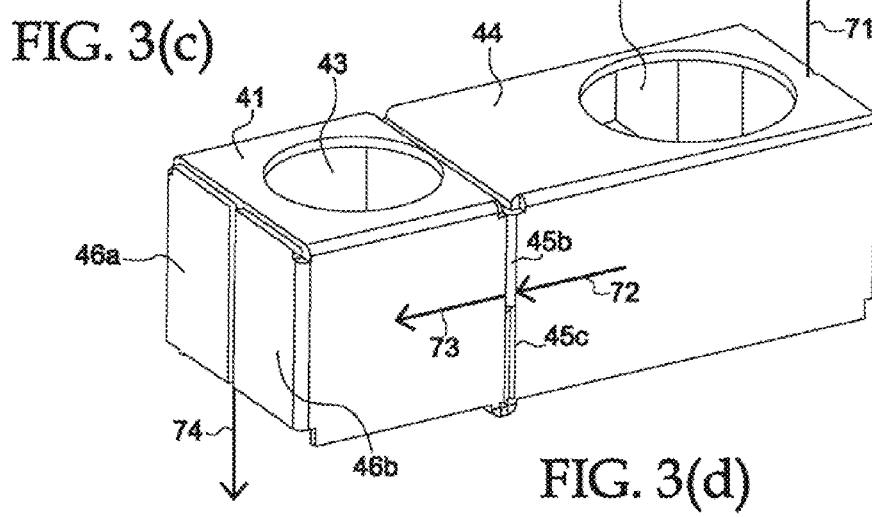

Further comparison of FIGS. 1 and 2 with FIGS. 3(a) through 3(d) will show, however, that there are distinct differences between the two types of housings or shields. One such difference is that housing or shield 40 shown in FIGS. 3(a) through 3(d) includes tabs 45a through 45d, which are disposed between the respective inner optically opaque sidewalls of first and second modules 41 and 44. The purpose of tabs 45(a) through 45(d) is to convey any vertical force that might be acting on one of the modules laterally to the other adjoining module and thence downwardly to an underlying substrate to which the housing or shield is attached, such as a PCB substrate. In FIG. 3(d), vertical force 71 is acting upwardly on second module 44. Vertical force 71 is translated or transferred laterally to first module 41 by way of forces 72 and 73, which are transmitted between second module 44 and first module 41 through one or more of tabs 45(a) through 45(d), and thence downwardly (as indicated by force vector 74) to an underlying substrate (not shown in FIGS. 3(a) through 3(d)). Such transfer and redirection of vertical forces acting on housing or shield 40 can also occur in the opposite direction, namely by having a vertical force acting initially on first module 41 transferred laterally to second module 44 and thence downwardly from second module 44 to an underlying substrate.

By transferring and redirecting vertical forces acting on housing or shield 40 between modules and the underlying substrate, undesired mechanical deformation of first and second modules 41 and 44 is prevented, or at the very least minimized to acceptable levels, so that the results shown in FIG. 2 are not obtained. That is instead of housing or shield 40 bending or deforming in some unexpected or undesired fashion when vertical forces are applied to housing or shield 40, the vertical forces are harnessed and redirected to an underlying structural member (the substrate) without causing damage or deformation to housing or shield 40.

Computer simulations of the deformation that occurs to housing or shield 40, shown in FIGS. 3(a) through 3(d) when a 5 Newton vertical force 71 is applied thereto show that the maximum amount of deformation that occurs in housing or shield 40 is on the order of about 17 micrometers. Computer simulations of the deformation that occurs to housing or shield 40 shown in FIGS. 3(a) through 3(d) when a 10 Newton vertical force 71 is applied thereto show that the maximum amount of deformation that occurs in housing or shield 40 is on the order of about 34 micrometers. In either case, the maximum deformation that occurs to housing or shield 40 is minimal, and indeed probably not even perceptible to an end user of an optical proximity sensor having a housing or shield 40 constructed in accordance with the teachings set forth herein.

Computer simulations of stress distributions that occur in housing or shield 40 shown in FIGS. 3(a) through 3(d) when a 5 Newton vertical force 71 is applied thereto show that the resulting stresses of about 432 Mpa are very evenly distributed throughout, housing or shield 40. Computer simulations of stress distributions that occur in housing or shield 40 shown in FIGS. 3(a) through 3(d) when a 10 Newton vertical force 71 is applied thereto show that the resulting stresses of about 867 Mpa are also very evenly distributed throughout housing or shield 40. In either case, stresses are distributed remarkably evenly throughout housing or shield 40.

Figure 4J:
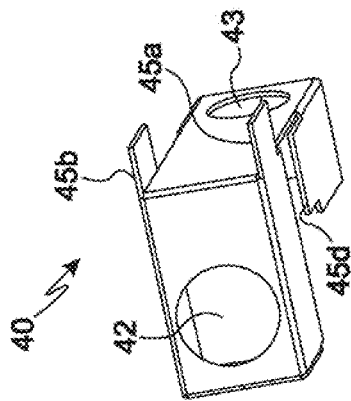
FIGS. 4(a) through 4(q) show various steps of forming an optical proximity sensor metal shield or housing according to another embodiment.
Figure 4L:
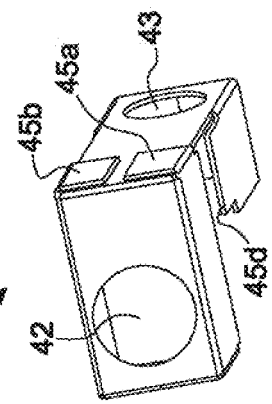
Figure 4I:
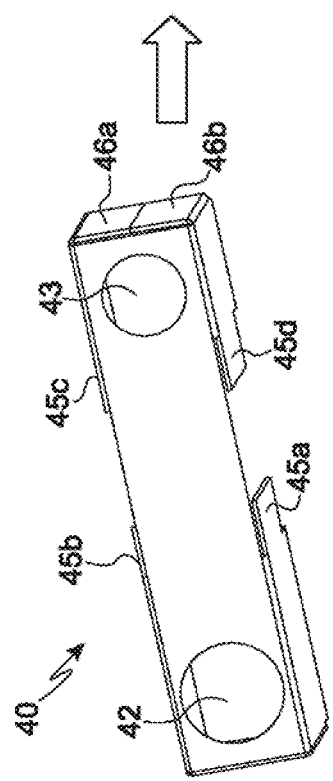
Figure 4K:
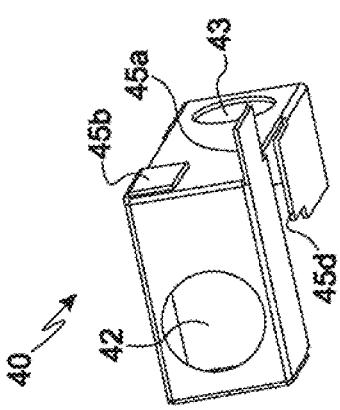
Figure 4M:
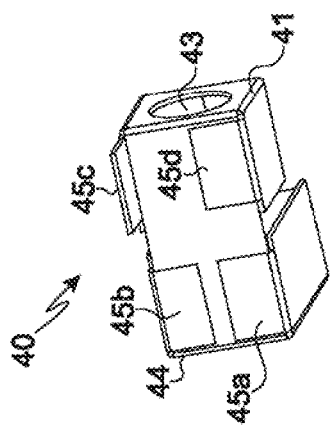
Figure 4N:
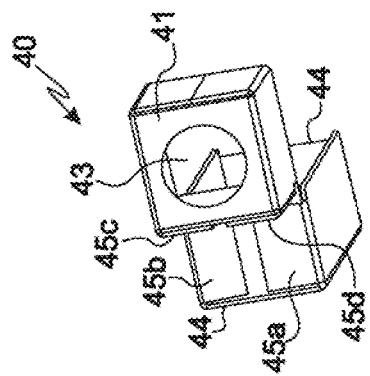
Figure 4O:
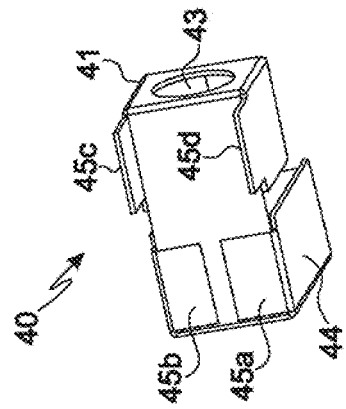
Figure 4P:
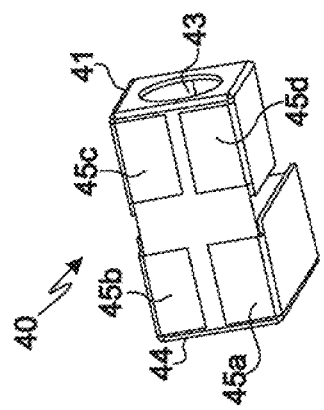
Figure 4Q:
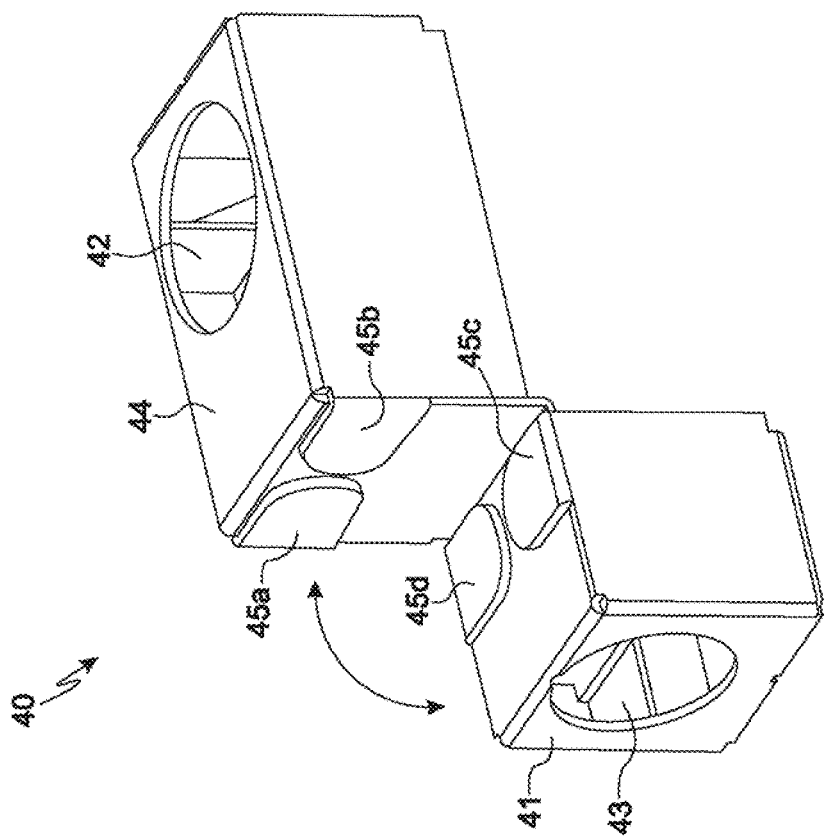

FIGS. 4(a) through 4(q) show various steps of forming optical proximity sensor metal shield or housing 40 according to one embodiment. As shown in FIGS. 4(a) through 4(q), one method of forming metal housing or shield 40 for an optical proximity, sensor begins with providing a single contiguous flat sheet of metal 40 (see FIG. 4(a) that has been cut and stamped to be folded ultimately into shield or housing 40 (see FIG. 4(q). As shown In FIG. 4(a), flat sheet of metal 40 initially comprises a plurality of tabs 45(a)-45(d), 46(a)-46(b), and 47(a)-47(b) extending outwardly therefrom, with precut or stamped apertures 42 and 43, where all the features of initially flat sheet of metal 40 are disposed substantially in a single plane. It will be appreciated that such an initial configuration for flat sheet of metal 40 results in low manufacturing costs and relative ease and speed of subsequent manufacturing, wherein that is required to complete the formation of housing or shield 40 is to bend various portions thereof in predetermined directions and to predetermined positions. No welding, gluing, or other costly means of joining various portions of housing or shield 40 together are required.

Continuing to refer to FIGS. 4(a) through 4(q), it will be seen that as housing or shield 40 is formed progressively by bending various portions thereof in certain directions and into certain predetermined positions, tabs 45(a) through 45(d) eventually wind up being disposed between modules 41 and 44 so that they can act as means for transferring forces between first module 41 and second module 44, and vice versa, and that tabs 46(a) and 46(b), and 47(a) and 47(b), wind up forming the end sidewalls of first module 41 and second module 44, respectively.

Figure 5:
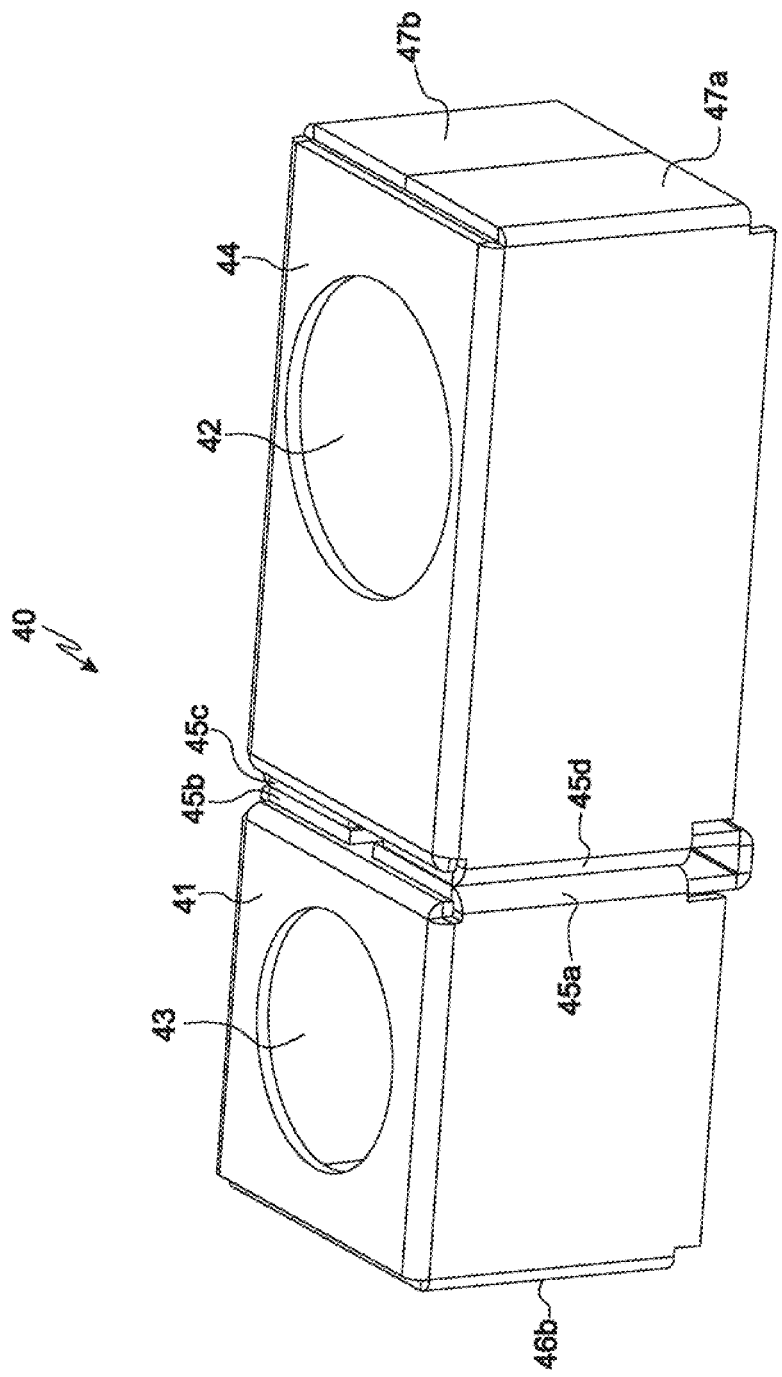
FIG. 5 shows a top perspective view of tabs forming a portion of an optical proximity sensor shield or housing according to yet another embodiment.

In the embodiment of housing or shield 40 illustrated in FIGS. 3(a) through 4(q), a total of two upper tabs (i.e., upper tabs 45(a) and 45(b) foldably attached to second module 44) and two lower tabs (i.e., lower tabs 45(c) and 45(d) foldably attached to first module 41), for a total of four tabs, are disposed between first and second modules 41 and 44. Contrariwise, in the embodiment of housing or shield 40 illustrated in FIG. 5, sets of left and right tabs 45a/45d and 45b/45c are disposed between first end second modules 41 and 44 for a total of four tabs, it will now become apparent to those skilled in the art that virtually infinite variations, combinations and permutations in the number, orientation, shape and specific configuration of tabs 45 may be employed successfully in a housing or shield 40 to transfer vertical forces between the modules of an optical proximity sensor. For example, one tab, two tabs, three tabs, five tabs, six tabs, seven tabs, eight tabs, or any other suitable number of tabs may be disposed between first and second modules 41 and 44 to such an end. Likewise, those skilled in the art will now understand that, the particular initial shape or configuration of the single piece or sheet of stamped or cut metal 40 may assume a virtually infinite number of shapes and still result in a housing or shield that is capable of redirecting vertical forces from one module to another.

Continuing to refer to FIGS. 4(*a*) through 5, the flat sheet of molar from which housing or shield 40 is formed may be stamped or cut using any of a number of different techniques know to those skilled in the art, such as laser cutting, melting with arc welders, mechanical abrasion or cutting, and so on. The metal from which housing or shield 40 is formed may be, by way of example, mild steel, stainless steel or nickel-plated steel stock.

Once housing or shield 40 has been formed, light emitter 20 and light emitter driving circuitry 21 may be mounted in first module 41, and light detector 30 and light sensing circuitry 31 may be mounted in second module 44. A printed circuit, board substrate may then be disposed beneath housing or shield 40 and operably connected to circuits 21 and 31 to yield an operative proximity sensor 10, which may then be incorporated info a portable electronic device such as a cellular telephone, a personal data assistant (PDA), a laptop computer, a notebook computer, or a computer Included within the scope of the present invention are methods of making and having made, the various components, devices and systems described herein.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. An optical proximity sensor, comprising:
   an infrared light emitter operably connected to and driven by a light emitter driving circuit;
   a light detector operably connected to and driven by a detector sensing circuit;
   a metal housing or shield formed of metal and comprising first and second apertures located over the light emitter and the light detector, respectively, such that at least a first portion of light emitted by the light emitter passes through the first aperture, and at least a second portion of the first portion of light reflected from an object of interest in proximity to the sensor passes through the second aperture for detection by the light detector;
   wherein the metal housing or shield further comprises first and second modules within which the light emitter and light detector are disposed, respectively, the first and second modules comprising adjoining optically opaque metal inner sidewalls to provide optical isolation between the first and second modules, the first and second inner sidewalls further being separated from one another by at least one metal tab foldably disposed therebetween, the at least one metal tab being configured to transfer a vertical force applied to one end of one module laterally to an opposite end of the other module such that a corresponding force acts downwardly at the opposite end of the other module on an underlying substrate to which the housing or shield is attached.

2. The optical proximity sensor of claim 1, wherein the substrate comprises a printed circuit board operably connected to the sensor, the vertical force being transferred from the first module to the printed circuit board at a location disposed below the second module.

3. The optical proximity sensor of claim 1, wherein the substrate comprises a printed circuit board operably connected to the sensor, the vertical force being transferred from the second module to the printed circuit board at a location disposed below the first module.

4. The optical proximity sensor of claim 1, wherein the optical proximity sensor is incorporated into a portable electronic device.

5. The optical proximity sensor of claim 4, wherein the portable electronic device is a cellular telephone, a personal data assistant (PDA), a laptop computer, a notebook computer, or a computer.

6. The optical proximity sensor of claim 1, wherein the first and second sidewalls are separated from one another by at least two metal tabs disposed therebetween.

7. The optical proximity sensor of claim 1, wherein the first and second sidewalls are separated from one another by at least three metal tabs disposed therebetween.

8. The optical proximity sensor of claim 1, wherein the first and second sidewalls are separated from one another by at least four metal tabs disposed therebetween.

9. The optical proximity sensor of claim 1, wherein the at least one tab is foldably formed as a portion of the first or second modules.

10. The optical proximity sensor of claim 1, wherein the metal shield or housing is formed from a single piece of metal that is bent or folded into a final shape as the housing or shield.

11. The optical proximity sensor of claim 1, wherein the metal shield or housing further comprises first and second outer sidewalls.

12. The optical proximity sensor of claim 11, wherein the first and second outer sidewalls comprise folded tabs.

13. The optical proximity sensor of claim 1, wherein the metal shield or housing is formed from a single piece of stamped and subsequently folded steel.

14. The optical proximity sensor of claim 13, wherein the stamped steel comprises mild steel, nickel-plated steel or stainless steel.

15. A method of forming a metal housing or shield for an optical proximity sensor, comprising:
   forming a flat sheet of metal configured to be folded into the shield or housing, the flat sheet of metal comprising a plurality of tabs extending outwardly therefrom;
   folding the flat sheet of metal into first and second modules configured to house a light emitter and a light detector therewithin, respectively, such that the first and second modules comprise adjoining optically opaque metal inner sidewalls to provide optical isolation therebetween, the first and second inner sidewalls further being separated from one another by the plurality of tabs foldably disposed therebetween, the tabs and first and second modules further being configured to translate a vertical force applied to one end of one of the modules laterally to an opposite end of the other module such that a corresponding force acts downwardly at the opposite end of the other module to an underlying substrate to which the housing or shield is attached.

16. The method of claim 15, wherein forming the flat sheet of metal comprises stamping the flat sheet.

17. The method of claim 15, further comprising selecting mild steel, stainless steel or nickel-plated steel stock for the flat sheet.

18. The method of claim 15, further comprising mounting a light emitter and light emitter driving circuitry in the first module after the first module has been folded into shape.

19. The method of claim 15, further comprising mounting a light detector and light sensing circuitry in the second module after the second module has been folded into shape.

20. The method of claim 15, wherein the plurality of tabs comprise four individual tabs configured to be folded in between the first and second modules.

\* \* \* \* \*